(12) United States Patent
Dietz et al.

(10) Patent No.: US 7,950,887 B2
(45) Date of Patent: May 31, 2011

(54) THREADED FASTENER WITH RETAINER AND METHOD OF MAKING SUCH FASTENER

(75) Inventors: Michael G. Dietz, Oxford, MI (US); Richard S. Brown, Brantford (CA); Charles Earl Abbate, Clinton Township, MI (US); Chris Fenech, Brownstown, MI (US)

(73) Assignee: MNP Corporation, Utica, MI (US)

( * ) Notice: Subject to any disclaimer, the term of this patent is extended or adjusted under 35 U.S.C. 154(b) by 538 days.

(21) Appl. No.: 12/075,331

(22) Filed: Mar. 11, 2008

(65) Prior Publication Data

US 2008/0159826 A1 Jul. 3, 2008

Related U.S. Application Data

(63) Continuation-in-part of application No. PCT/US2007/015776, filed on Jul. 11, 2007, now Pat. No. 7,465,137, and a continuation-in-part of application No. 11/484,821, filed on Jul. 11, 2006.

(51) Int. Cl.
*F16B 41/00* (2006.01)
*F16B 25/00* (2006.01)

(52) U.S. Cl. .................. 411/386; 411/301; 411/999

(58) Field of Classification Search ............ 411/383, 411/393, 386, 970, 999, 301–304
See application file for complete search history.

(56) References Cited

U.S. PATENT DOCUMENTS

| | | | |
|---|---|---|---|
| 1,869,947 A * | 8/1932 | Shook | 411/204 |
| 2,108,036 A * | 2/1938 | Gowell | 16/19 |
| 2,283,494 A | 5/1942 | Erdman | |
| 2,703,725 A | 3/1955 | Vagi | |
| 2,852,056 A * | 9/1958 | Rapata | 411/304 |
| 3,439,575 A | 4/1969 | Gifford | |
| 3,466,966 A | 9/1969 | Brown | |
| 3,770,036 A | 11/1973 | Sherman | |
| 4,003,286 A | 1/1977 | Hallock | |
| 4,557,651 A | 12/1985 | Peterson | |
| 4,732,519 A | 3/1988 | Wagner | |
| 4,810,145 A | 3/1989 | Villas | |
| 4,952,107 A | 8/1990 | Dupree | |
| 5,094,579 A | 3/1992 | Johnson | |
| 5,547,324 A | 8/1996 | Durr et al. | |
| 5,558,480 A * | 9/1996 | Kazino et al. | 411/368 |
| 5,628,601 A | 5/1997 | Pope | |
| 5,722,139 A | 3/1998 | Ladouceur et al. | |
| 5,803,692 A | 9/1998 | Postadan | |
| 5,947,509 A | 9/1999 | Ricks et al. | |
| 5,967,725 A | 10/1999 | Voges | |
| 6,116,832 A | 9/2000 | Wolf et al. | |
| 6,394,724 B1 | 5/2002 | Kelly et al. | |
| 6,679,666 B2 | 1/2004 | Mizuno et al. | |
| 6,910,841 B2 | 6/2005 | Isenberg | |
| 7,137,766 B2 | 11/2006 | Weinstein et al. | |
| 7,182,565 B2 * | 2/2007 | Buytaert et al. | 411/441 |
| 7,465,137 B2 * | 12/2008 | Dietz et al. | 411/386 |
| 7,530,775 B2 * | 5/2009 | Jaconelli et al. | 411/383 |
| 2004/0136812 A1 | 7/2004 | Kawai et al. | |

* cited by examiner

OTHER PUBLICATIONS

Print out from Finnveden website, www.finnveden.com, Innovative Screws Solve Several Problems, May 11, 2006, 2 pages.

*Primary Examiner* — Flemming Saether
(74) *Attorney, Agent, or Firm* — Reising Ethington P.C.

(57) ABSTRACT

A fastener element (16) has a head section (18), a threaded shank section (17) with threads (20) at a pitch and a distal end section (22). A retention device (24) is secured to the distal end section and is engageable with a fastener receiving member (14).

8 Claims, 9 Drawing Sheets

US 7,950,887 B2

THREADED FASTENER WITH RETAINER AND METHOD OF MAKING SUCH FASTENER

This application is a continuation-in-part to PCT Application Ser. No. PCT/US2007/15776 filed on Jul. 11, 2007 now U.S. Pat. No. 7,465,137 and U.S. patent application Ser. No. 11/484,821 filed on Jul. 11, 2006.

TECHNICAL FIELD

The field of this invention relates to a threaded fastener with a retainer at its distal end and a method of manufacturing the threaded fastener.

BACKGROUND OF THE DISCLOSURE

Threaded fasteners have long been used to join two or more components. It has been found advantageous to easily prelocate a threaded fastener and mate parts prior to torque tightening the fastener into location by rotating along a thread helix. This is particularly true with assemblies where the orientation and weight of the mating parts require that the parts be held in place while a driving tool is retrieved and placed in location to engage the fastener for tightening the fastener in place. This prelocation is also particularly useful for self-threading fasteners where the mating receptacle is initially unthreaded.

Previous snap in fasteners have been overly complicated and added unacceptable costs to fasteners when used in high volume during an assembly line operation. Furthermore, previous retention devices placed onto a distal threaded end of a fastener often separated from the fastener during shipping and before the fastener was installed in place.

What is needed is a low cost expeditiously manufactured threaded fastener with a retainer that can be pushed into position with a low entry force and be able to resist a much higher exiting or pulling force to temporarily hold two mating parts together. What is also needed is a retainer that resists separation from the fastener.

SUMMARY OF THE DISCLOSURE

In accordance with one aspect of the invention, a fastener assembly has a fastener member with a head section constructed to be engageable with a driving tool. A threaded shank section has threads at a pitch. A retention device member is secured to a distal end section integrally formed with the fastener member. The retention device is engageable to a fastener receiving member, for example a nut, when the distal end section is inserted into a hole therethrough.

Preferably the distal end section of the threaded fastener member has a circumferential groove. For this invention, the terms "groove", "recess" and "undercut" are used interchangeably and are generic in meaning. The retention device engages the circumferential groove to be positively engaged onto the distal end section by being adheredly molded. In one embodiment, the distal end section is in the form of a dog point.

The threaded shank section is self-threading for engaging the hole in the fastener receiving member. The hole is initially unthreaded. It is desirable that the retention device has at least one outer extension flange section angled radially outwardly and axially toward the head section and is sized to engage an inside wall of the hole in the fastener receiving member to provide insertion of the fastener assembly in the hole with a low entry force and to resist higher exiting forces.

In one embodiment, the retention device is a cap member that is molded over the distal end section. The cap member has at least one outer extending flexible flange extending radially outwardly and axially toward the head section. At least one outer extending flange has a pitch corresponding to the pitch of threads on the threaded shank section. The hole in the fastener member can be initially threaded. The distal end section can be axially inserted into the hole with a low entry force and resist greater axial exiting forces and be threaded out of the hole. The flange can snap fit over the threads in the hole when the fastening member is axially pushed in.

According to another aspect of the invention, a fastener assembly has a fastener element with a self-threading shank section, an engageable head section and a distal dog point. The distal dog point has an undercut section spaced from an end. A retention device member is in the form of an elastomeric cap molded over the distal dog point with a rim section inwardly extending to engage and adhere to the undercut section. The cap has at least one outer flange sized to engage an internal wall of a hole in a fastener receiving member. At least one outer flange is angled radially outwardly and axially toward the head section.

In accordance with another aspect of the invention, a reusable fastener assembly includes a fastener element having a threaded shank section with threads at a pitch, a head section, and a distal end section. The distal end section has an undercut section spaced from an end. A retention device member is engaged to the undercut section with at least one radially extending flange sized to engage internal threads in a hole of a fastener receiving member. At least one flange is tapered radially outwardly and axially toward the head section and is flexible in one direction to snap fit into the internal threads with an axial directed entry force onto the fastener assembly but resist a higher axial exiting force. At least one flange has a pitch corresponding with the pitch of the threads on the threaded shank section and with the internal threads of the hole such that the retention device member can be threaded out of the hole for reuse with the fastener element.

In accordance with another aspect of the invention, a fastener assembly has a fastener element with a head section constructed to be engageable with a driving tool, a threaded shank section with threads having a pitch and an integrally formed distal end section. The distal end section has a recess therein spaced from its distal end. A retention device member is secured to the distal end section. The retention device engages the recess and positively engages onto the distal end section. The retention device has at least one outer extension flange and is angled radially outwardly and axially toward the head section. The flange circumferentially extends 360° about the retention device. The retention device has a securement collar extending along the distal end section toward the head section. The retention device member is engageable to a fastener receiving member when the distal end section is inserted into a hole in the fastener receiving member. The retention device is sized to engage an inside wall of the hole in the fastener receiving member to provide insertion of the fastener assembly in the hole with a low entry force and resists higher exiting forces.

Preferably, the securement collar extends 360° about the distal end section. It is also desirable that the flange is continuously tapered from its base to a radially outer tip.

In one embodiment, the flange has a first surface that is frustoconical in shape facing away from the head and a second surface annular in shape facing the head. The second surface of the flange is preferably substantially transverse to a generally longitudinal axis of the fastener assembly. The distal end section preferably has a distal end with an enlarged diameter section. A radially inwardly positioned cavity extends axially from the distal end through the enlarged diameter section. The retainer cap has a fill section filling the cavity.

In accordance with another aspect of the invention, a fastener assembly has a fastener element with a head section constructed to be engageable with a driving tool, a threaded shank section with threads having a pitch and an integrally formed distal end section. The distal end section has a circumferential groove. A retention device member is secured to the distal end section by engaging the circumferential groove in proximity to a proximate end of the retention device to be positively engaged onto the distal end section. The retention device has at least one outer extension flange being angled radially outwardly and axially toward the head section with a radially outer tip axially aligned over the groove section. The outer extension flange extends 360° about the retention device. The flange is continuously tapered from its base to a radially outer tip. The flange has a first surface that is frusto-conical in shape facing away from the head and a second surface that is annular in shape facing the head. Preferably, the second surface of the flange is substantially transverse to a generally longitudinal axis of the fastener assembly.

In accordance with another aspect of the invention, a method of manufacturing a fastener assembly includes the steps of roll forming a headed blank to form a threaded fastener member with threads on a shank portion and a distal end with a retaining shaped end, placing the threaded fastener member in a mold, and adheredly molding a retention device on the distal end with the retaining shaped end.

Preferably, the roll forming forms a retaining groove in the distal end, and the adheredly molding includes molding the retention device to extend into the retaining groove.

In accordance with another aspect of the invention, a method of manufacturing a threaded fastener includes placing a headed blank between two roll dies each having a threaded roll section and a contour section with an apex laterally extending beyond the threaded roll section and positioned at the bottom end of the threaded roll section and roll forming the headed blank to simultaneously form threads and a distal end with a retainer groove on a shank portion thereof.

In accordance with another aspect of the invention, a roll die for manufacturing a fastener has a threaded roll section for rolling threads into a headed blank, and a contour section at the bottom of the thread roll section with an apex downstream from an open beginning to roll form a groove in the headed blank below a formed threaded section. Preferably, the contour has its apex near a mid-point of the roll die.

In accordance with another embodiment, the method of manufacturing a fastener assembly includes the steps of roll forming a headed blank to form a threaded fastener member with threads on a shank portion and a distal end with a retaining shaped end having a recess spaced from the distal end, placing the threaded fastener member in a mold, and molding a retention device onto the distal end with the retaining shaped end having a flange with a frustoconical surface and a first annular surface and a securement collar extending from the first annular surface to the second annular surface. The mold has a frustoconical surface axially aligned with the recess of the threaded fastener and faces toward the head. The mold has its first annular surface extending radially inward from a radially outer tip of the frustoconical surface. The mold has its second annular surface spaced from the first annular surface toward the head and extends radially outward from the threaded fastener. The mold has an axially extending shoulder extending from an inner edge of the first annular surface toward the head to an outer edge of the second annular surface. Preferably, the axially extending shoulder extends 360° about the threaded fastener for providing a securement collar molded 360° about the threaded fastener.

BRIEF DESCRIPTION OF THE DRAWINGS

Reference now is made to the accompanying drawings in which:

FIG. 12a is a top plan view of the dies and bolt shown in FIG. 12;

DETAILED DESCRIPTION OF THE PREFERRED EMBODIMENT

Figure 1:
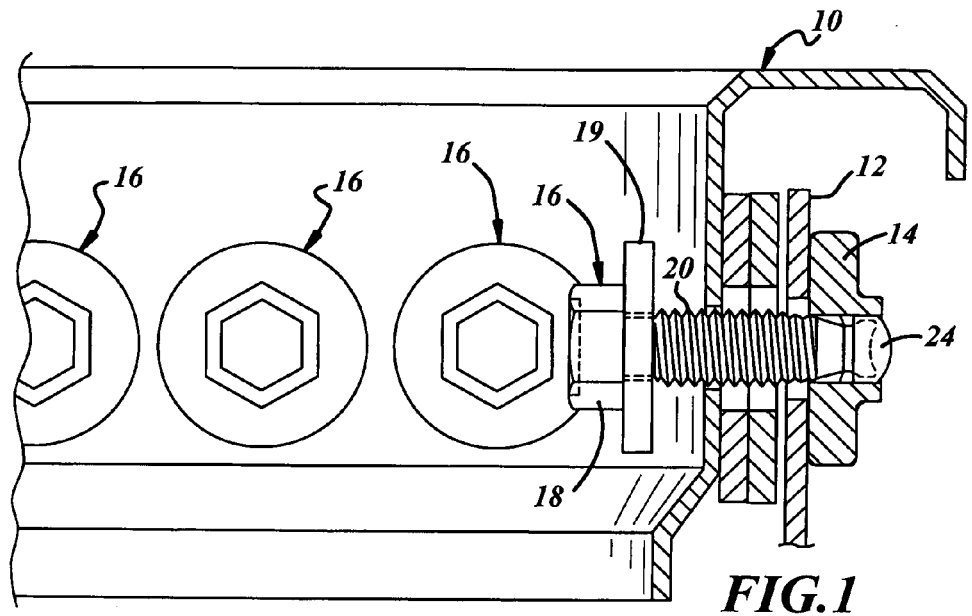
FIG. 1 is a front perspective view and a segmented view showing a plurality of fasteners in accordance with one embodiment of the invention in location temporarily holding an airbag curtain in location.

Referring now to FIG. 1, an airbag anchor and mounting bracket assembly 10 is secured to sheet metal 12 of a motor vehicle through a weld nut 14 secured on the back side of the sheet metal 12. A plurality of fastener assemblies 16 can be temporarily secured to the weld nuts 14 to temporarily hold the anchor and mounting bracket assembly 10 in place to the sheet metal 12 before the fasteners assemblies 16 are fully tightened by an appropriate driving tool (not shown).

Figure 2:
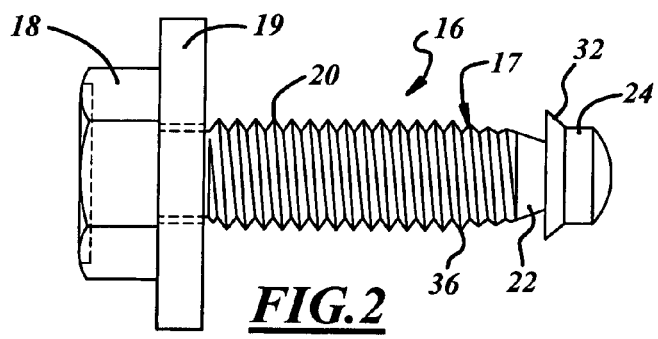
FIG. 2 is side elevation view of one threaded fastener assembly shown in FIG. 1.
Figures 3, 4:
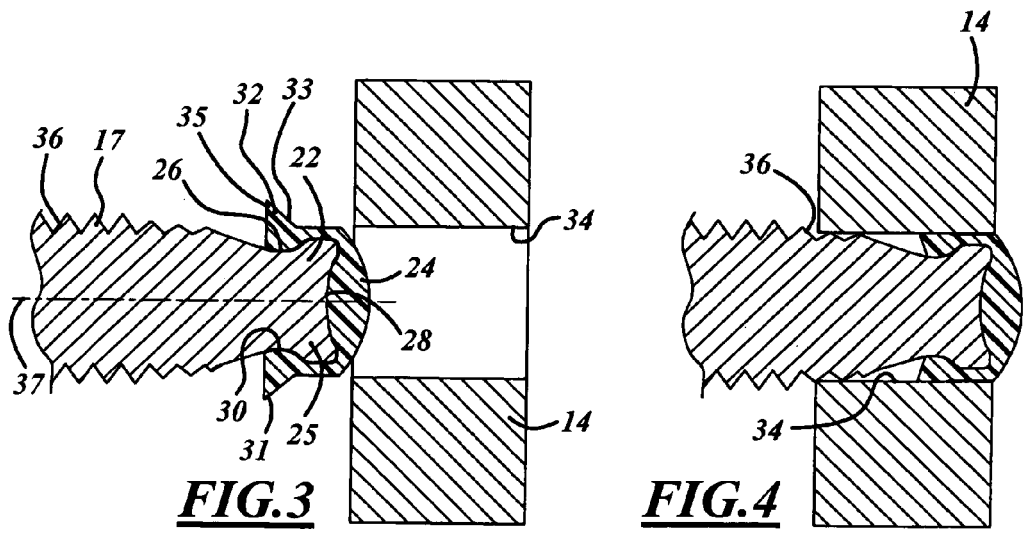
FIG. 3 is a side segmented and fragmentary view of the retainer prior to entry to a nut member.
FIG. 4 is a view similar to FIG. 3 showing the retainer engaged in a nut member.

Referring now to FIGS. 2 and 3, a fastener assembly 16 includes a fastener member 17 and a retainer cap member 24. The fastener member 17 has a head section 18, a threaded shank section 20 that passes through a washer 19. A distal end section 22 is at the opposite end. The distal end section 22 has the cap member 24 molded thereon. The cap member 24 may be a moldable polymer such as commercially available PVC. The distal end of a section 22 is in the form of a dog point 25 with an undercut groove 26 spaced from the end 28. As shown in FIG. 3, the retainer cap 24 has an inwardly extending retaining rim 30 that engages the groove 26 to form a positive lock with the distal end section 22 of the fastener member to prevent axial removal of the retainer member from the distal end section 22, i.e., the rim 30 of cap member 24 is overmolded into the groove 22 to form a positive engagement.

The retainer cap member 24 also has an outwardly extending flange 32 that has a taper radially outward and toward the head section 18. The 32 has a first surface 33 that is frustoconical in shape and faces away from head section 18. The flange 32 has a second surface 35 that is annular in shape. The second surface 35 is generally transverse to longitudinal axis 37 and extends between the radially outer tip 31 of frustoconical surface 33 and rim surface 30. Alternatively, the second surface 35 may have a frustoconical shape such that it forms a concavity when viewed from the head 18. Flange 32 can extend 360 degrees completely about the cap member outer diameter. As shown clearly in FIG. 3, the flange 32 is axially aligned over the undercut groove 26.

The flange 32 also has a diameter sized larger then the unthreaded hole 34 in the weld nut 14. As shown in FIG. 4, the fastener assembly can be axially inserted into the nut hole 34. The yieldably flexible nature of the PVC material and the taper of the flange 32 allows ease of entry of the retainer cap into the hole 34. However, the taper and angle of the flange 32 will resist a much higher axially directed exiting force exerted on fastener member 17. As shown in FIG. 4, the fastener assembly 16 may be inserted until the self tapping threads 36 abut the nut 14 about hole 34.

Figure 5:
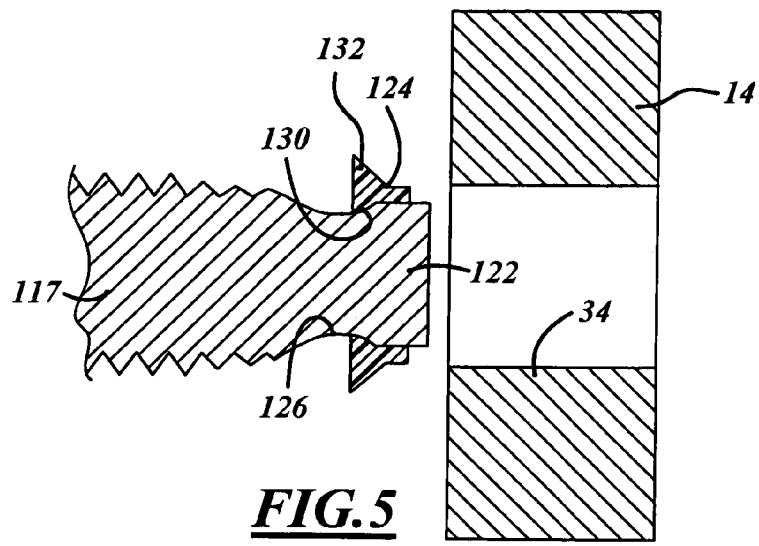
FIG. 5 is a view similar to FIG. 3 showing a modified embodiment.
Figure 6:
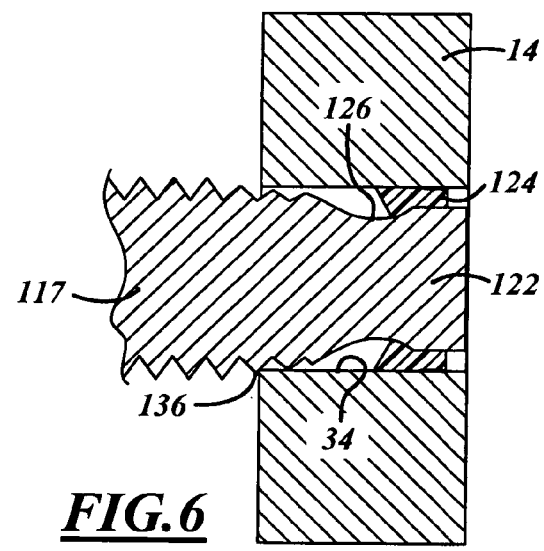
FIG. 6 is a view similar to FIG. 5 showing the modified retainer engaged in a nut member.

Referring to FIGS. 5 and 6, an alternate retainer device 124 is shown on a modified fastener member 117. The fastener member 117 has its dog point distal end section 122 with a groove 126 having a different profile than that shown in the first embodiment. The retainer device 124 has an annular ring shape rather than a cap form such that the dog point distal end section 122 of the fastener member 117 extends entirely through the retainer device 124. The retainer device 124 has a similar rim 130 and outer flange 132 as described for the first embodiment and can be made from a similar material. The threads 136 are similarly the self-threading type. The second embodiment provides the low entry force and higher resistance to exiting forces and functions in the same fashion as the first embodiment.

Figure 17:
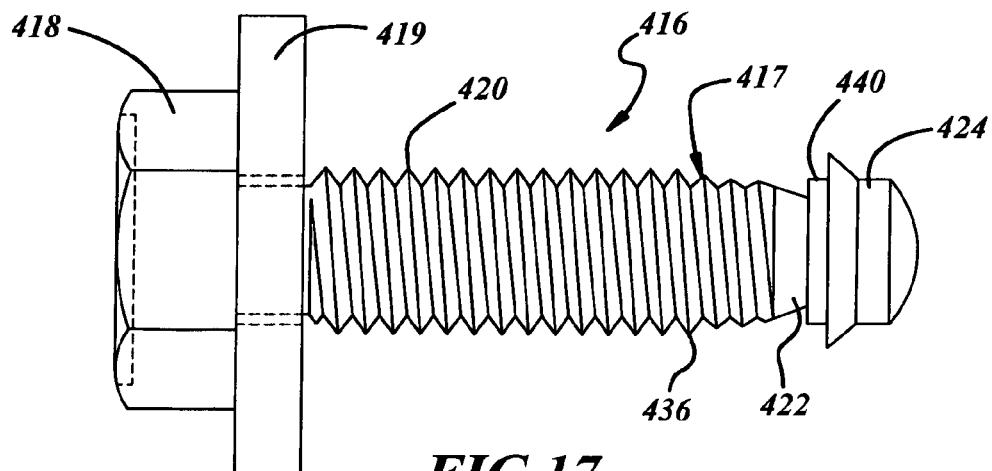
FIG. 17 is a side elevational view similar to FIG. 2 showing a modified threaded fastener assembly.
Figure 18:
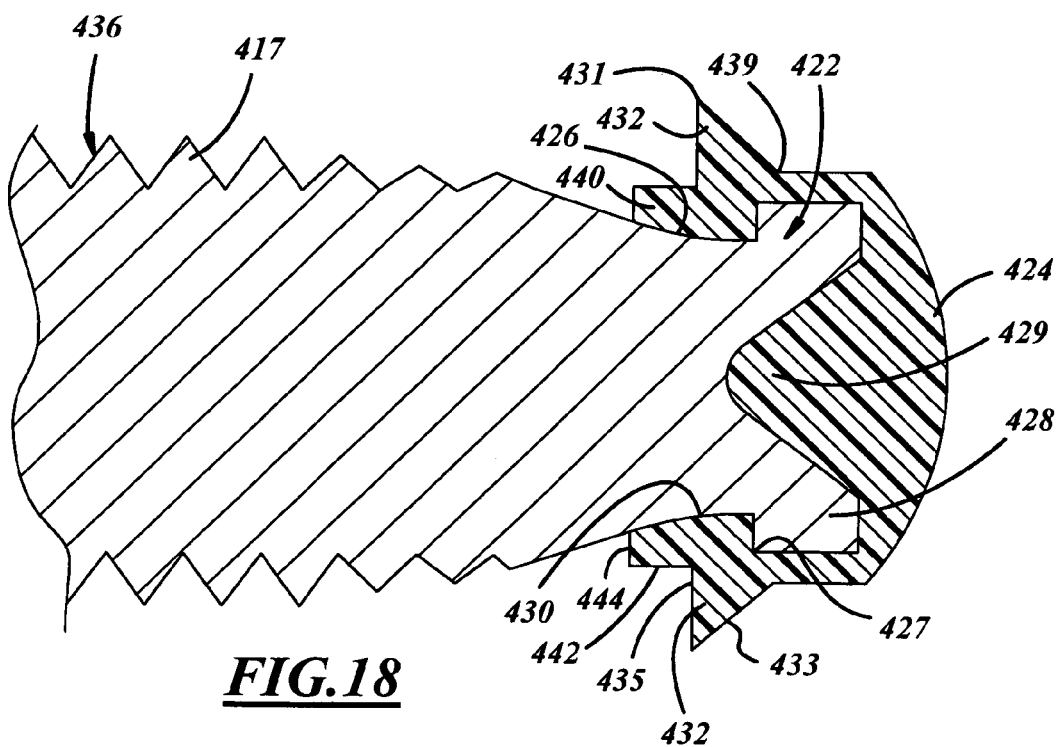
FIG. 18 is a side segmented and fragmentary view of the fastener assembly shown in FIG. 17.

In certain applications, for example smaller dimensioned fasteners, or if the retainer cap is made from a softer more pliable polymer, extra securement may be desired to assure that the retainer caps remain secured onto the threaded fastener during shipping, handling and installation. As shown in FIGS. 17 and 18, a modified fastener assembly 416 is shown that has a modified fastener member 417 and retainer cap member 424. The fastener 417 has a head section 418, threaded shank section 420. A distal end section 422 has a reduced diameter section 426 and an enlarged end section 428 with a transverse shoulder surface 427. The enlarged end section 420 also has an end cavity 429 that axially extends through the enlarged end section 428.

The retainer cap member 424 fills the end cavity 429 and wraps over end 428 and closely follows the transverse shoulder surface 427 and has a reduced diameter rim section 430 abut against the reduced diameter section 426 of fastener 417.

The frustoconical surface 433 has its distal base edge 439 axially aligned with the enlarged station 428 and extends axially such that the radially outer up 431 is aligned over reduced diameter section 426. The annular surface 435 extends radially inward from flange tip 431 to an axially extending collar section 440 at a proximal base edge of the flange. The collar section has an outer cylindrical shoulder 442 of reduced diameter compared to the distal base edge 439 and an annular end 444 that extends down to rim 430. The collar section 440 axially extends from annular surface 435 toward head section 418.

Figure 7:
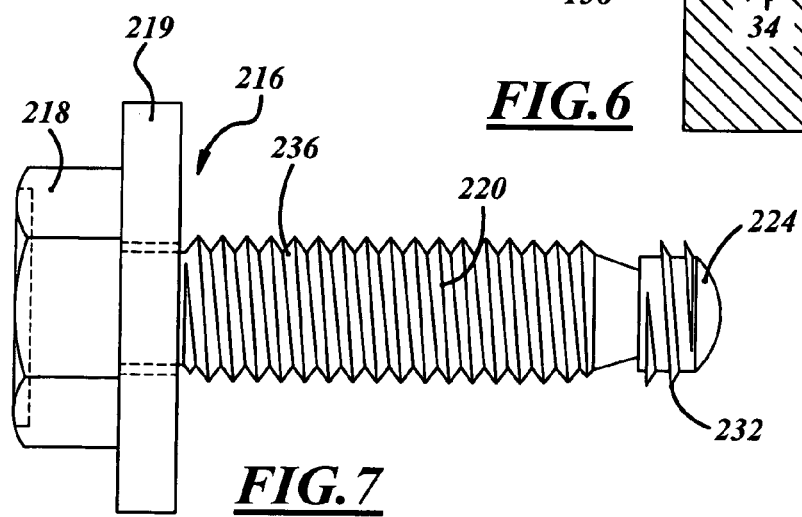
FIG. 7 is a view similar to FIG. 2 showing a threaded fastener with a modified retainer.
Figure 8:
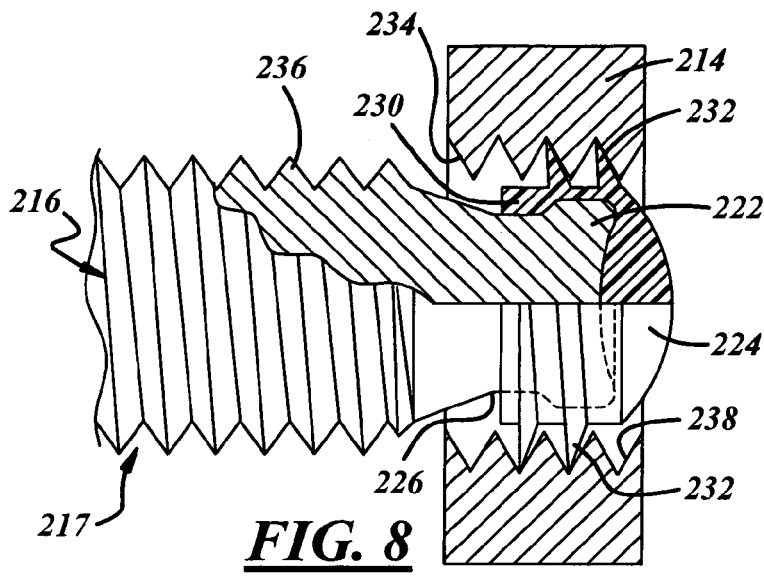
FIG. 8 is a fragmentary side and partially segmented view showing the retainer shown in FIG. 7 engaging a threaded nut.

Referring now to FIGS. 7 and 8, a reusable fastener assembly 216 is shown. The retainer cap 224 has a helical outer flange 232 similarly tapered toward the head section 218. A washer 219 is placed adjacent the head section 218. In addition, the helical outer flange 232 has a pitch that corresponds with the pitch of threads 236 on the threaded shank 220. The inner rim 230 is molded on the dog point distal section 222 of the fastener member 217 in the same fashion as described for the first embodiment with the rim 230 overmolded into groove 226.

As shown in FIG. 8, the flange 232 can be axially snap fitted into the threads 238 of threaded nut 214. However, the shape and angle of the flange 232 will resist much higher axially directed exiting forces to prevent the fastener assembly from axially exiting the nut without rotation. The threads 238 of nut 214 in hole 234 are also pitched at the same angle as the pitch of the helical flange 232 and threads 236.

The fastener member 217 with the retainer cap may be rotated to either fasten the threads into the nut 214 or can be rotated in an opposite rotational direction to remove both the fastener member 217 and the retainer cap 224 from the nut 214 such that the fastener assembly 216 may be reused.

The reusable fastener element shown in FIGS. 7 and 8 are desirable for field use such as attaching armor plating to humvees and the other military vehicles that may need extra armor. The fastener easily allows one person to lift the armor plate and push in the fastener element to temporarily hold the armor plate onto the vehicle while the person retrieves a fastener tool to then tighten the fastener elements in place. The fastener elements can be threadably removed when it is desired to remove the armor from the vehicle and retains its structural integrity and shape to be reused.

Figure 9:
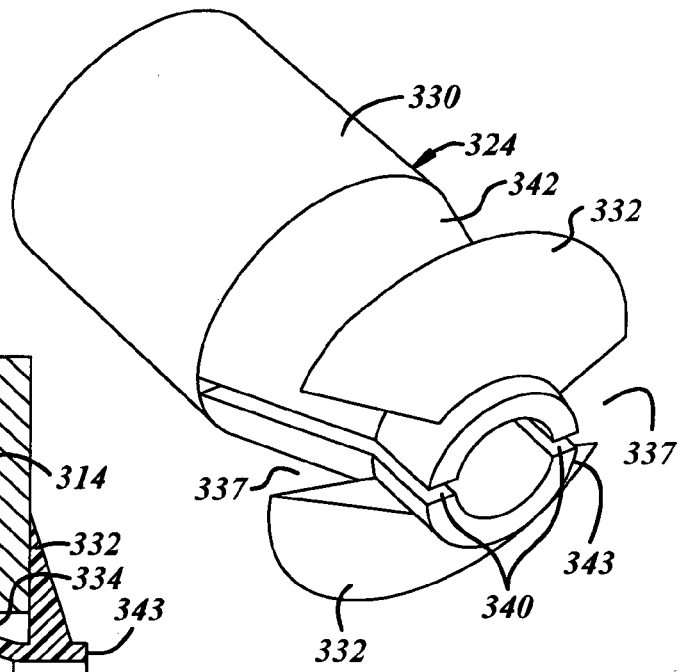
FIG. 9 is a perspective view of an alternate embodiment of a retainer.
Figure 10:
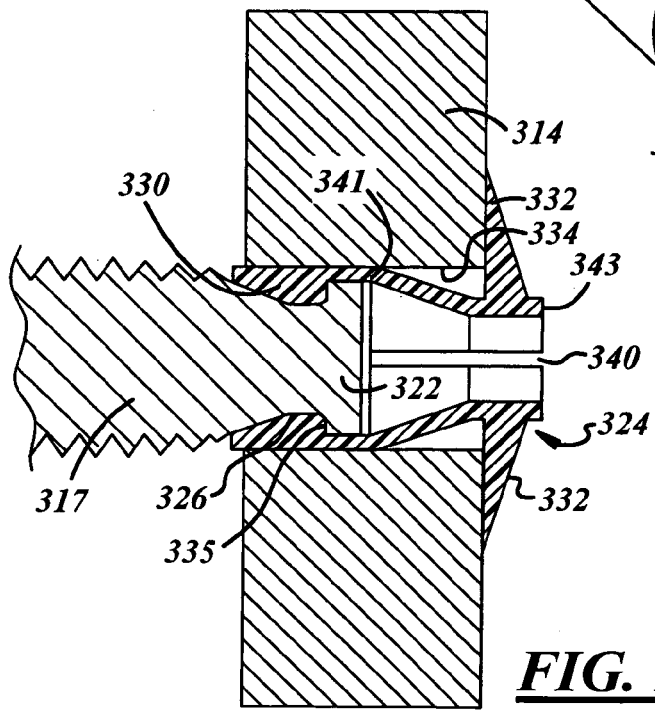
FIG. 10 is a side segmented view illustrating the retainer cap installed onto a fastener member and engaged with a nut member.
Figure 11:
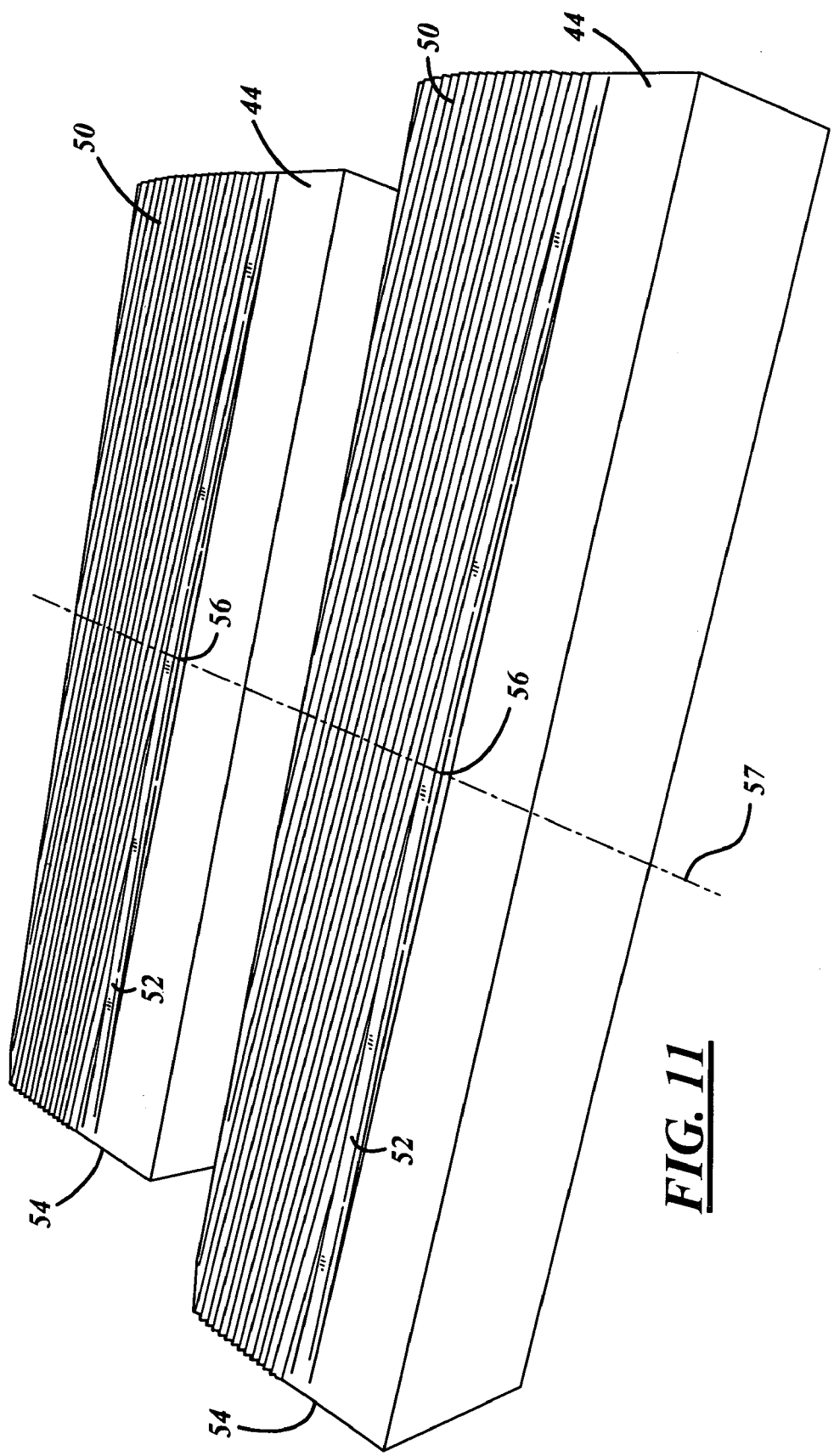
FIG. 11 is a perspective view of a pair of threaded roll dies for use in manufacturing of the fastener shown in FIG. 1.

All of the above embodiments provide temporary retention with the nut without the need of the fastener assembly protruding beyond the nut. This aspect is advantageous when there is little or no space or clearance behind the nut. However it is foreseen that many applications may provide for a clearance or extra space behind the nut. In these applications a retainer device 324 may have its outer flange 332 as shown in FIGS. 9 and 10 inserted totally through the nut to engage the backside of the nut to prevent the fastener from disengaging. It still has its inner rim section 330 engaging the groove 326 to provide a positive interconnection between the retainer cap and a fastener member. In this embodiment, it is noted that the profile of the undercut groove 326 has transverse shoulder 335 with the dog point distal section 322 and this provides a stronger resistance against exiting pulling forces exerted on the fastener member. The retainer device 324 has spaces 337 between the flange 332 and a pair of axially extending slots 340 extending from distal end section 343 through tapering section 342 and up to rim section 330 to provide extra flexibility to the retainer device 324 as it passes through hole 334.

For all the above described embodiments, a fastener can be temporarily located in either a threaded or unthreaded nut hole holding two members temporarily in place. While these fastener assemblies are particularly suitable to be dimensioned for resisting up to 5 lb. of exiting force without disengaging the nut for retaining the airbag anchor in place, the fastener assemblies may be sized up or down for other applications, including applications with exiting forces exceeding 5 lbs. The fastener can be quickly pushed into place while an operator may then retrieve an appropriate driving tool to then rotate each fastener member along its thread helix to its final tightened condition with the nut. The use of these fastener assemblies provides for a so called third hand for the operator and can speed up an assembly line type operation.

For lighter duty applications, the overmold feature of the rim 30 into a groove 26 may be eliminated and the fastener member may be retained solely by frictional engagement between the cap member molded onto the fastener member.

Figure 12:
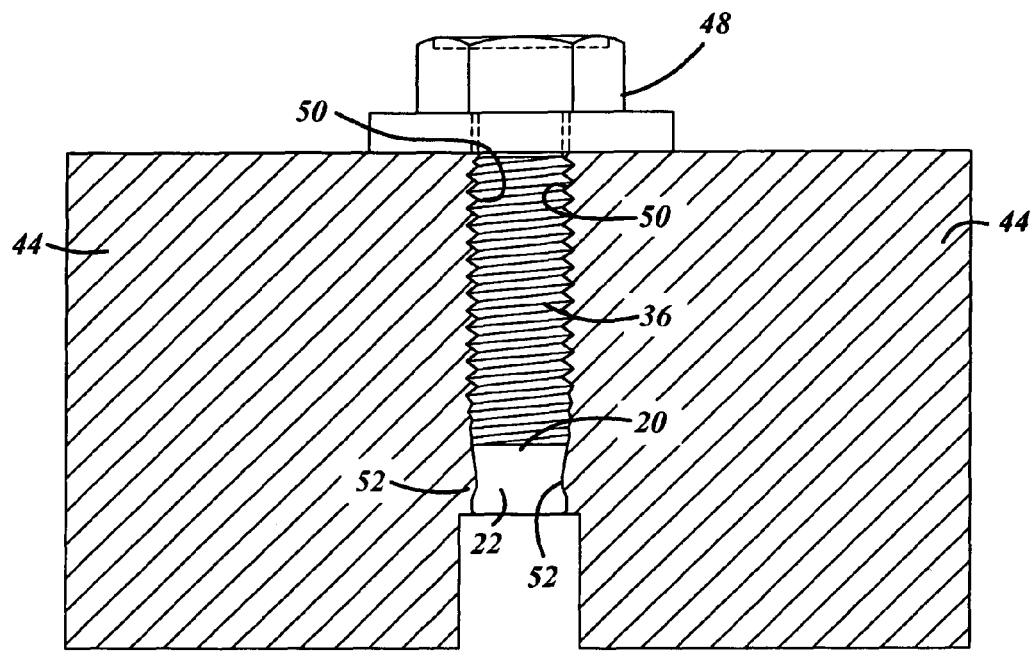
FIG. 12 is a sectional view of the two dies in position with a bolt introduced near the beginning of the cycle.
Figure 13:
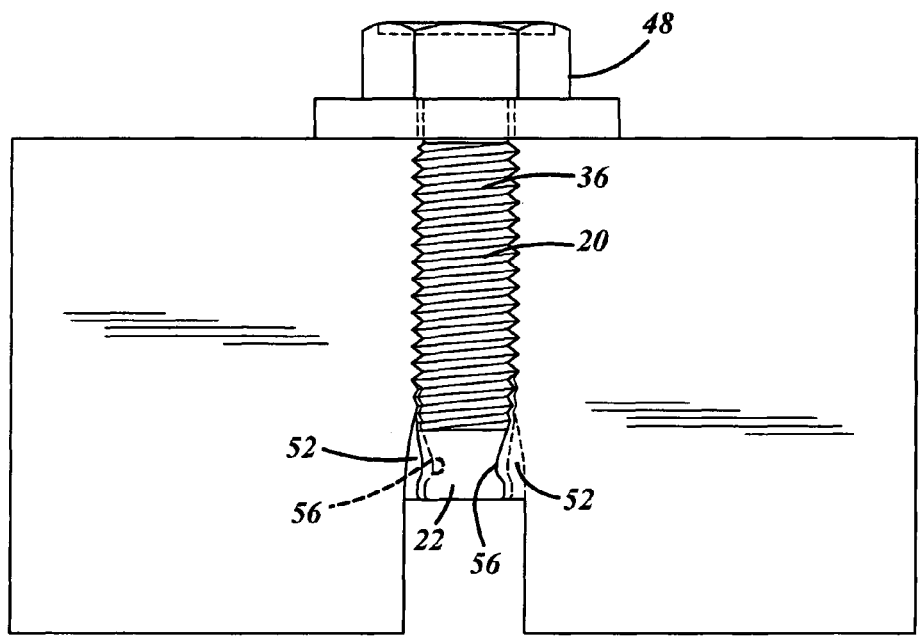
FIG. 13 is an end view of the two dies and bolt shown in FIG. 12.
Figure 14:
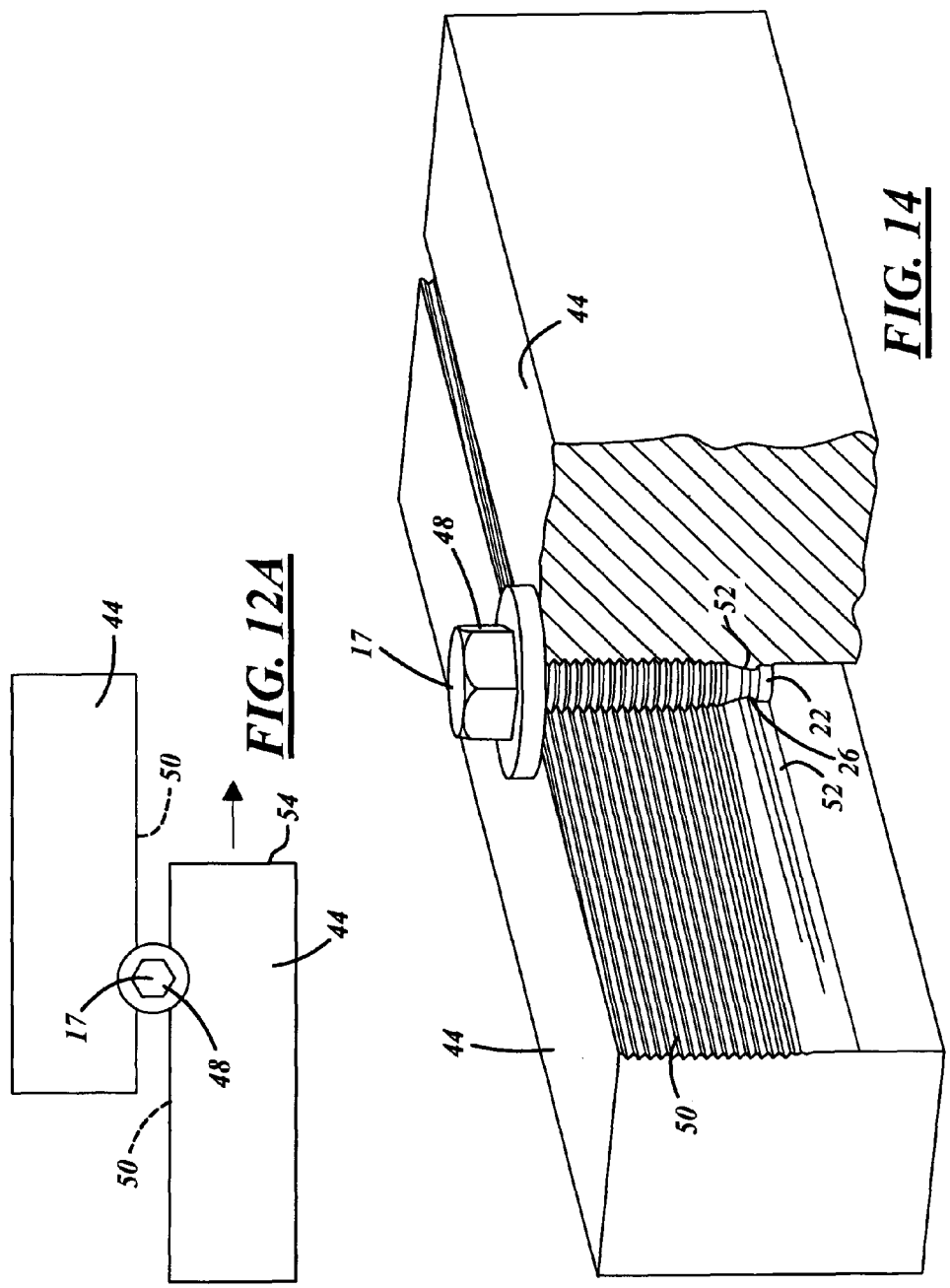
FIG. 14 is a fragmentary perspective view of the fastener and roll dies shown in FIG. 12.

Referring now to FIGS. 11-14, the fastener member 17 is expeditiously manufactured by using two thread roll dies 44. One die 44 is stationary and the other is movable with a headed bolt blank 48 positioned therebetween. Each die 44 has thread rolls 50 to form the threads 36 on the shank portion 20 in a conventional fashion. Each roll die 44 also has a rising contour 52 which rises from the open ends 54 toward the apex 56 near the middle axis 57 of the respective die 44. The contour 52 forms the distal end section 22 with the groove 26. The headed bolt blank 48 rolls with the relative movement of the dies 44 in much the same fashion as clay is rolled between a person's sliding hands to form an elongated roll of clay. The fastener member 17 is fully formed with threads and its contoured distal end once the blank approached the middle section of both dies 44. The progression of the contour 52 to form the groove 26 is more clearly shown in FIGS. 12, 12*a* and 13. In FIG. 12, the sectional view is shown near the beginning of the roll operation before the distal end 22 is fully formed. The contour is not yet fully intruded into the blank. FIG. 12*a* clearly shows the bolt 17 interposed between the two dies 49. As shown in FIG. 13, the contour is better shown in phantom as the opposing dies 44 are rolling the blank where each die 44 pinches and forces metal movement of the blank to form the distal end 22 and groove 26 simultaneously as the threads 36 are also formed. As shown in FIG. 14, the finished fastener member 17 is shown near the midpoint of each die 44.

Figure 16:
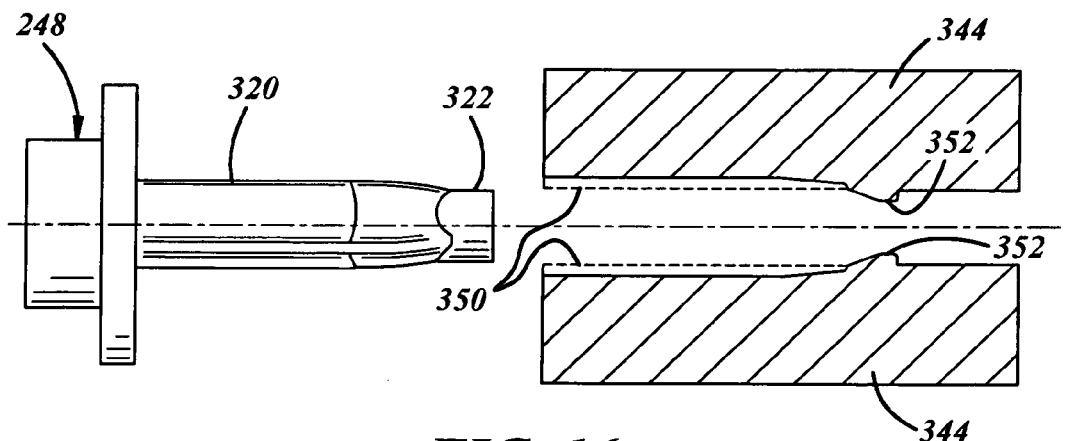
FIG. 16 is a schematic sectional view of the headed blank and thread roll dies for the fastener shown in FIG. 10.

Referring now to FIG. 16, a schematic of the roll dies 344 and a headed blank 348 with a shank portion 320 and distal portion 322 is shown which is used to make the fastener element 317 as shown in FIG. 10. The concept and operation of the rolls 344 is the same as above described with thread section 350 but the rolls have a different contour 352 to provide a different shaped distal end section 322 for increased exiting pull forces as above described.

Figure 15:
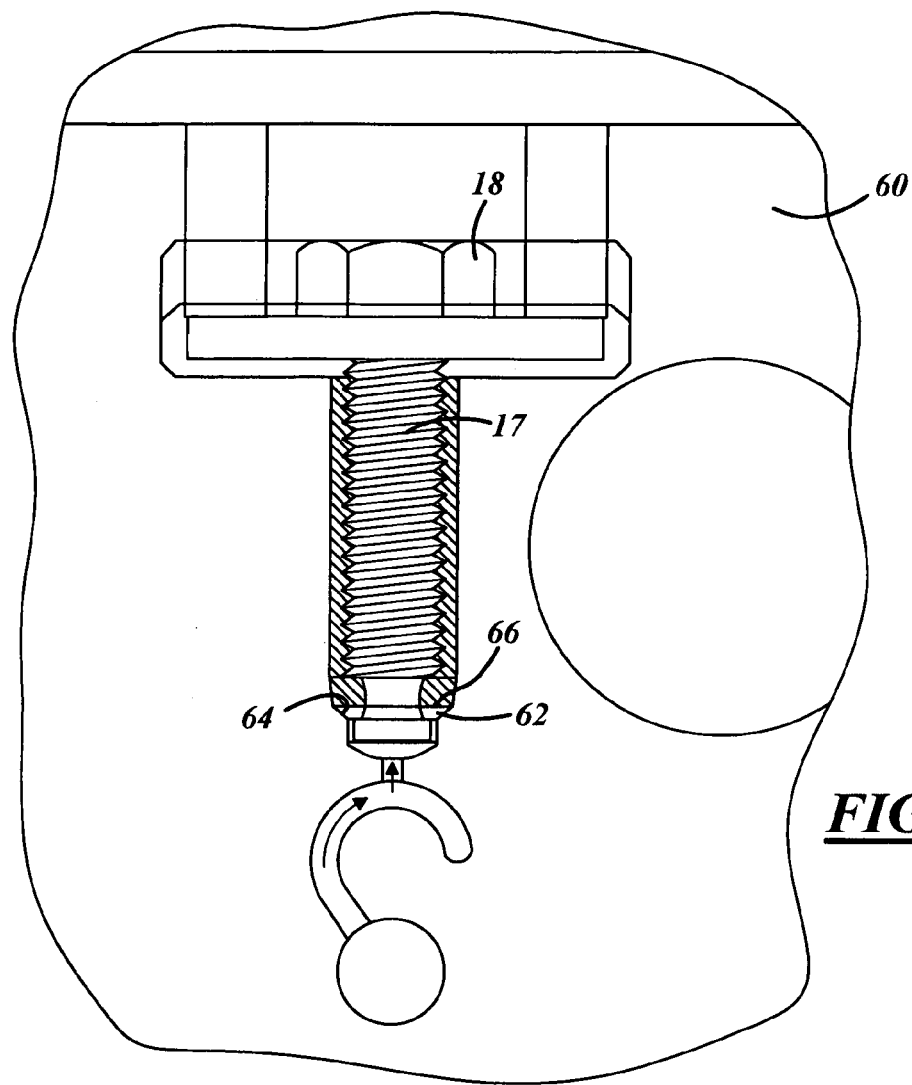
FIG. 15 is a schematic view of the overmold station where the retainer cap member is molded onto the distal end section of the fastener member.

Once the fastener is expeditiously formed using the roll dies, the fastener member 17 is placed in a mold 60 as shown in FIG. 15. Elastomeric material is injected into a cavity 62 formed within the mold and against the fastener member 17. The cavity 62 has the shape corresponding to the shape of the retainer cap member 24. For example, FIG. 15 illustrates cavity 62 corresponding to the retainer cap 24 with frustoconical shaped surface 64 facing head 18, annular surface 66 facing away from head 18 to form the surfaces 33 and 35 of flange 32. After the newly formed retainer cap member 24 is sufficiently cooled and set, the mold 60 can be opened to obtain the finished fastener assembly 16.

Figure 19:
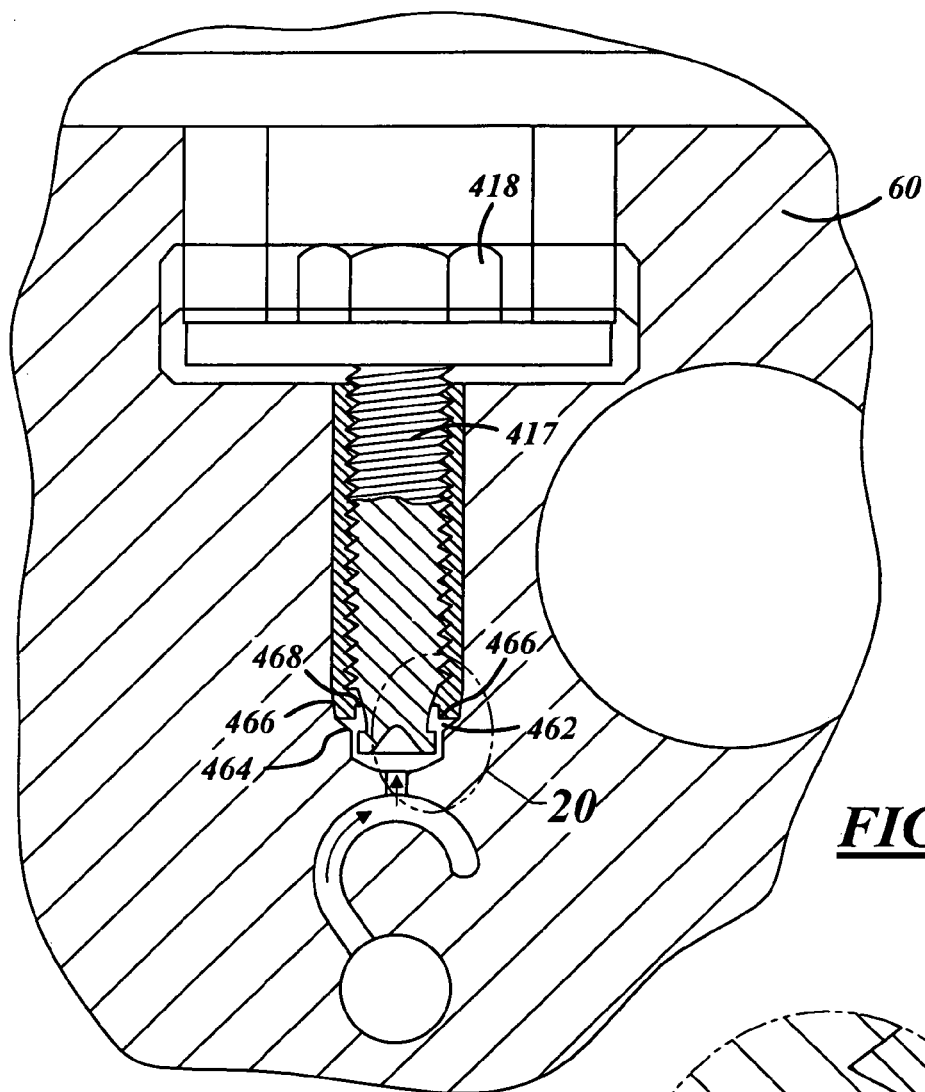
FIG. 19 is a schematic view of an overmold station for molding the retainer cap member onto the fastener shown in FIG. 17.
Figure 20:
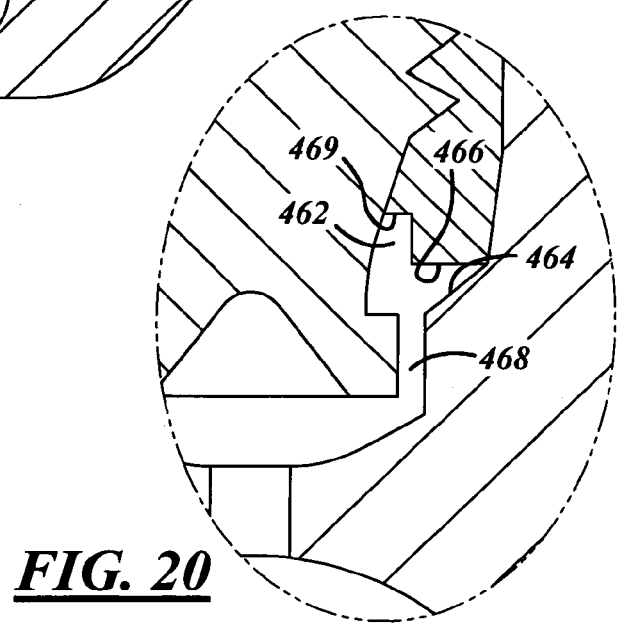
FIG. 20 is an enlarged fragmentary view further illustrating the cavity for molding the retainer cap member shown in FIG. 19.

Another example is the mold shown in FIGS. 19 and 20 which show the mold containing threaded fastener 418 as shown in FIGS. 17 and 18. Cavity 462 corresponds to shape of retainer cap 424. The mold has a frustoconical surface 464 facing toward head 418 and first annular surface 466 and second annular surface 469 facing away from head 418 corresponding to surfaces 433, 435 and 444 of the retainer cap 426. In addition, cavity section 468 corresponds to securement collar 444.

Other variations and modifications are possible without departing from the scope and spirit of the present invention as defined by the appended claims.

The invention claimed is:

1. A fastener assembly comprising:
    a fastener element with a head section constructed to be engageable with a driving tool, a threaded shank section with threads having a pitch and an integrally formed distal end section;
    said distal end section having a recess therein;
    a retention device member secured to said distal end section;
    said retention device engaging said recess and positively engaged onto said distal end section;
    said retention device having at least one outer extension flange and angled radially outwardly and axially toward said head section from its base, said base having a proximal edge and distal edge;
    said at least one flange extending 360° about said retention device;
    said retention device having a securement collar extending about and along said distal end section of said fastener element toward said head section from said proximal edge of the base of said outer flange, said securement collar having an outer diameter that is of reduced size relative to a diameter of said distal edge of said base of said flange;
    said retention device member engageable to a fastener receiving member when said distal end section is inserted into a hole in said fastener receiving member; and
    said retention device being sized to engage an inside wall of said hole in said fastener receiving member to provide insertion of said fastener assembly in said hole with a low entry force and to resist higher exiting forces.

2. A fastener assembly as defined in claim 1 further comprising:
    said securement collar extending 360° about said distal end section.

3. A fastener assembly as defined in claim 2 further comprising;
    said flange being continuously tapered from its base to a radially outer tip.

4. A fastener assembly as defined in claim 3 further comprising:
    said flange having a first surface that is frustoconical in shape facing away from the head and a second surface that is annular in shape facing the head.

5. A fastener assembly comprising:
    a fastener element with a head section constructed to be engageable with a driving tool, a threaded shank section with threads having a pitch and an integrally formed distal end section;
    said distal end section having a recess therein;
    a retention device member secured to said distal end section;
    said retention device engaging said recess and positively engaged onto said distal end section
    said retention device having at least one outer extension flange and angled radially outwardly and axially toward said head section;

said at least one flange extending 360° about said retention device;

said retention device having a securement collar extending along said distal end section toward said head section;

said retention device member engageable to a fastener receiving member when said distal end section is inserted into a hole in said fastener receiving member;

said retention device being sized to engage an inside wall of said hole in said fastener receiving member to provide insertion of said fastener assembly in said hole with a low entry force and to resist higher exiting forces;

said securement collar extending 360° about said distal end section;

said flange being continuously tapered from its base to a radially outer tip said flange having a first surface that is frustoconical in shape facing away from the head and a second surface that is annular in shape facing the head; and said second surface of said flange being substantially transverse to a generally longitudinal axis of said fastener assembly.

6. A fastener assembly as defined in claim 5 further comprising:

said distal end section having an enlarged diameter section;

a radially inwardly positioned cavity extends axially from said distal end section through said enlarged diameter section; and said retainer cap having a fill section filling said cavity.

7. A fastener assembly comprising:

a fastener element with a head section constructed to be engageable with a driving tool, a threaded shank section with threads having a pitch and an integrally formed distal end section;

said distal end section having a circumferential groove;

a retention device member secured to said distal end section;

said retention device engaging said circumferential groove in proximity to a proximate end of the retention device to be positively engaged onto said distal end section;

said retention device having at least one outer extension flange being angled radially outwardly and axially toward said head section and with a radially outer tip axially aligned over said groove section;

said at least one outer extension flange extending 360° about said retention device;

said flange being continuously tapered from its base to a radially outer tip;

said flange having a first surface that is frustoconical in shape facing away from the head and a second surface that is annular in shape facing the head;

said retention device member engageable to a fastener receiving member when said distal end section is inserted into a hole in said fastener receiving member; and said retention device being sized to engage an inside wall of said hole in said fastener receiving member to provide insertion of said fastener assembly in said hold with a low entry force and to resist higher exiting forces; and said second surface of said flange being substantially transverse to generally longitudinal axis of said fastener assembly.

8. A fastener assembly as defined in claim 7 further comprising:

said distal end section having an enlarged diameter section;

a radially inwardly position cavity extends axially from said distal end section through said enlarged diameter section; and said retainer cap having a fill section filling said cavity.

* * * * *